Sept. 12, 1967
R. I. MELTZER ETAL
3,341,543
SUBSTITUTED QUINOLIZINES
Filed Jan. 2, 1963
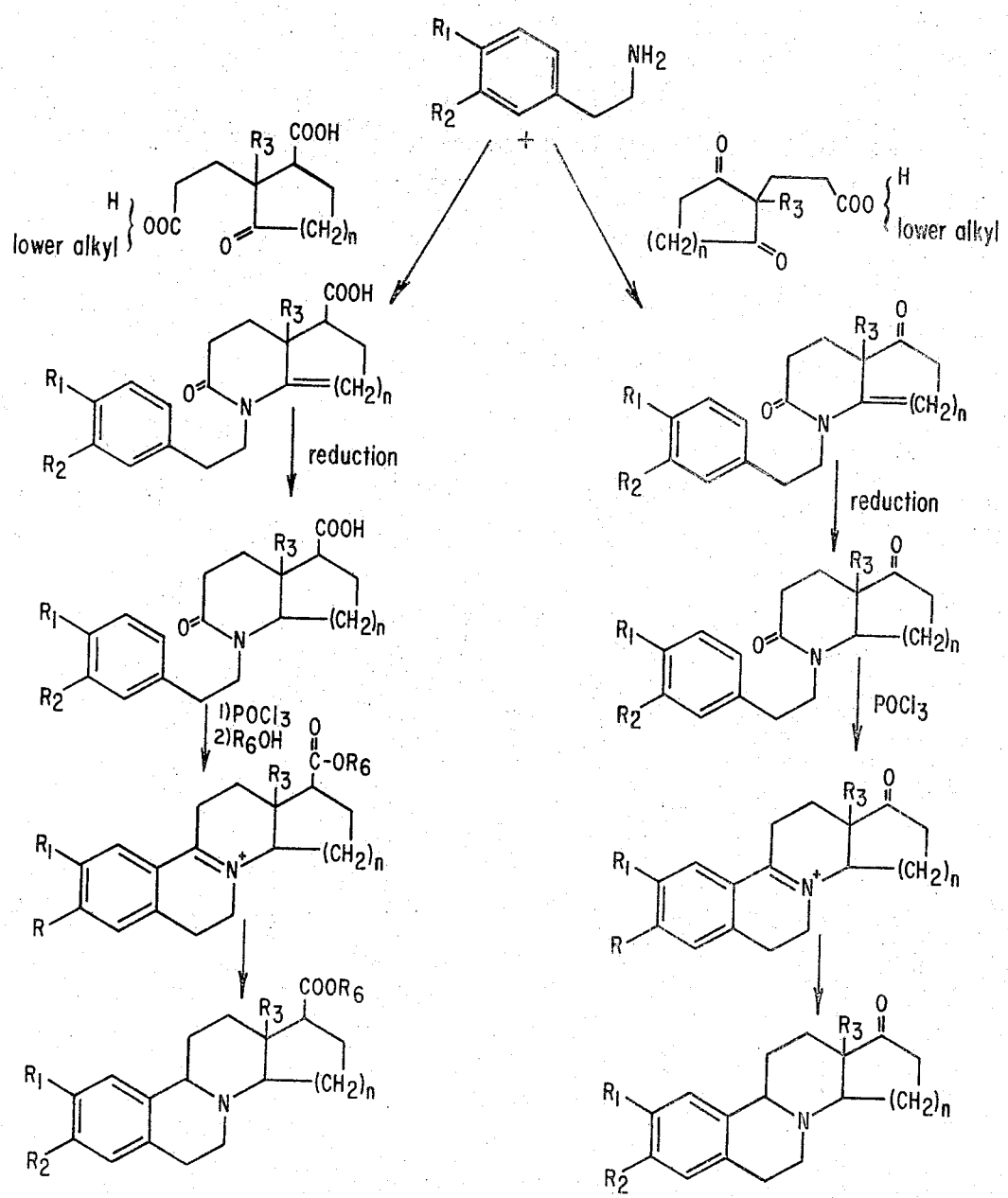
INVENTOR.
ROBERT I. MELTZER
BY RICHARD E. BROWN ވ
United States Patent Office 3,341,543
Patented Sept. 12, 1967

3,341,543
SUBSTITUTED QUINOLIZINES
Robert I. Meltzer, Rockaway, and Richard E. Brown, Hanover, N.J., assignors to Warner-Lambert Pharmaceutical Company, Morris Plains, N.J., a corporation of Delaware
Filed Jan. 2, 1963, Ser. No. 248,872
33 Claims. (Cl. 260—286)

This invention relates to novel substituted quinolizines having the following structural formula:

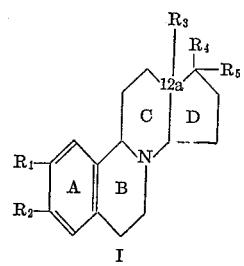

I

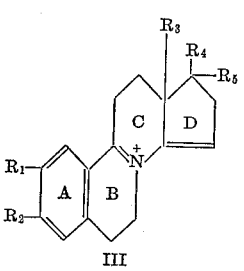

III

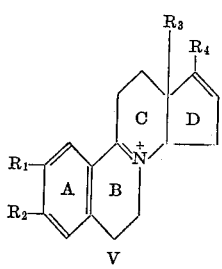

V

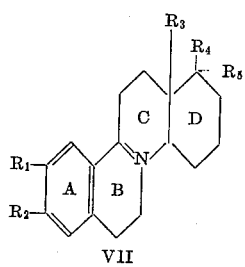

VII

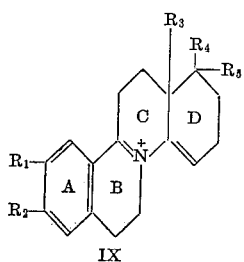

IX

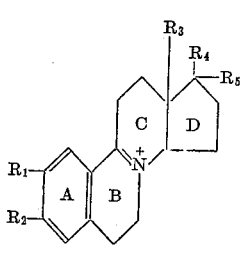

II

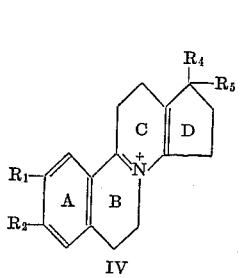

IV

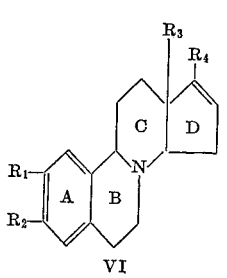

VI

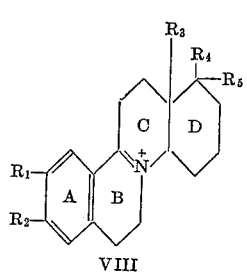

VIII

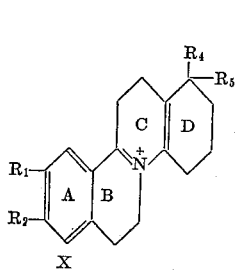

X

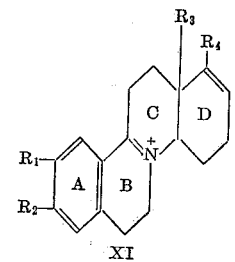

XI

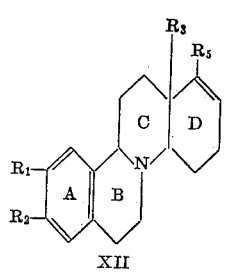

XII wherein $R_1$ and $R_2$ each represents hydrogen, hydroxy or lower alkoxy such as methoxy or methylene dioxy; $R_3$ represents hydrogen or lower alkyl such as methyl or ethyl; $R_4$ represents hydrogen, lower alkyl such as methyl or ethyl, alkenyl such as vinyl, alkynyl such as ethynyl, or alkoxy such as ethoxy; $R_5$ represents hydrogen, hydroxy, acyloxy, alkoxy, —$COCH_3$, —$COCH_2OH$, —COOEt,

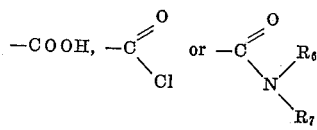

in which $R_6$ and $R_7$ may be hydrogen, lower alkyl or $R_6$ and $R_7$ taken together with the nitrogen to which they are attached form a heterocyclic radical such as

or $R_4$ and $R_5$ taken together with the carbon atom to which they are attached represent a keto radical such as

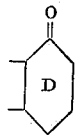

or a cyclic ketal radical such as

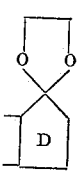

and to the nontoxic pharmaceutically acceptable acid addition and quaternary ammonium salts thereof.

The compounds of this invention are substituted quinolizines of the ring system comprised of the 4 rings denoted by A, B, C and D of the above formulas. When Ring D is a five membered ring such as

the substituents are in the bracketed positions which follow; $R_1(9)$, $R_2(8)$, $R_3(12a)$, $R_4(1)$ and $R_5(1)$ and when Ring D is a six membered ring such as

the substituents are in the bracketed positions which follow; $R_1(10)$, $R_2(9)$, $R_3(13a)$, $R_4(1)$ and $R_5(1)$. The numbering of these ring systems is indicated below:

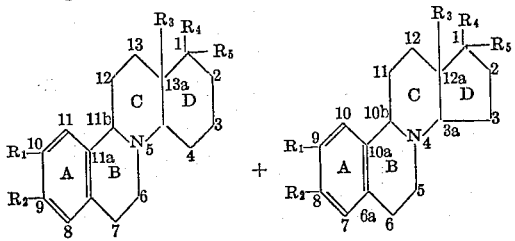

Compounds II, III, IV, V, VIII, IX, X and XI above, on treatment with an alkali undergo a shift of the azomethine double bond according to the usual behavior of partially hydrogenated quinolizium compounds. Thus, for example, Compound II on treatment with an alkali metal hydroxide will result in the formation of a compound of the formula

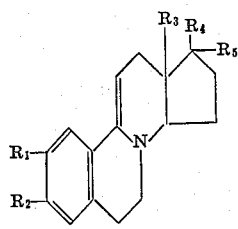

These compounds are also within the scope of this invention.

This invention also relates to a new and novel method of preparing the above compounds and to novel intermediates obtained during the synthesis. Exemplary of the new and novel quinolizines are:

2,3,3a,5,6,11,12,12a-octahydro-8-methoxy-1H-benzo[a]cyclopenta[f]quinolizinium bromide
2,3,3a,5,6,11,12,12a-octahydro-8,9-dihydroxy-1H-benzo[a]cyclopenta[f]quinolizinium bromide
2,3,3a,5,6,11,12,12a-octahydro-8-hydroxy-1H-benzo[a]cyclopenta[f]quinolizinium bromide
1,2,3,3a,5,6,10b,11,12,12a-decahydrobenz[a]cyclopenta[f]quinolizin-8-ol-hydrobromide
1,2,3,3a,5,6,10b,11,12,12a-decahydro-8,9-dimethoxy-13a-methyl-1H-dibenzo[a,f]quinolizine hydrobromide
1,2,3,3a,5,6,10b,11,12,12a-decahydro-8,9-dimethoxy-benz[a]cyclopenta[f]quinolizine hydrobromide
1,2,3,3a,5,6,10b,11,12,12a-decahydro-8-methoxy-benz[a]cyclopenta[f]quinolizine hydrobromide
2,3,3a,5,6,11,12,12a-octahydro-8,9-dimethoxy-1H-benzo[a]cyclopenta[f]quinolizinium dichlorophosphate
2,3,4,4a,6,7,13,13a-octahydro-9,10-dimethoxy-13a-methyl-1H-dibenzo[a,f]quinolizine and the like.

As can be readily appreciated the compounds of this invention resemble the steroid compounds structurally and can be considered to be azasteroids. If a steroid nomenclature is used the compound 3,3a,5,6,10b,11,12,12a - octahydro - 8 - hydroxy-12a-methyl-benzo[a]cyclopenta[f]quinolizin-1(2H)-one which has the following structural formula:

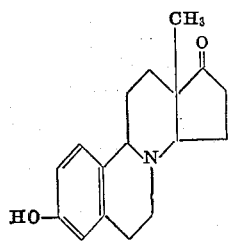

can also be named a stereo isomer of D,L8-azaestrone.

The new and novel compounds of this invention have interesting pharmacological activity and are useful in the treatment of shock and circulatory collapse. They also possess steroidal activity. In addition, they are valuable intermediates in the production of other compounds of this substituted quinolizine structure.

We have found that compounds of this invention may be produced in accordance with the reactions as exemplified in the following series of equations. The symbols $R_1$, $R_2$, $R_3$, $R_4$ and $R_5$ used hereinafter are the same as defined above.

Step I involves the condensation of substituted phenylalkylamines such as

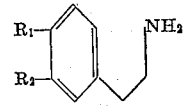

by refluxing for about 3 to 6 hours in an inert organic solvent such as xylene with an equal molar ratio of a keto ester or acid such as carbalkoxyethyl cyclopentanone of the formula:

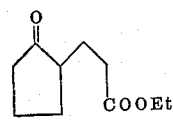

to obtain a yellow oily compound of the structure

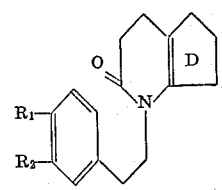

The $R_1$ and $R_2$ substituted phenyalkylamines such as 3,4-diethoxyphenylethylamines are well known compounds which are described in the literature, for example, in Chemical Abstract, vol. 56, page 10006g, and by Ide et al. in J.A.C.S., vol. 59, page 726 (1937).

The above compound may be cyclized by refluxing with phosphorous oxychloride to obtain a compound of the structure

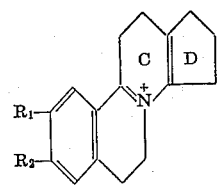

Alternatively, the compound may be reduced in accordance with Step II before it is cyclized. We have also found that the substituted phenylalkylamines may also be condensed with a keto ester or acid such as

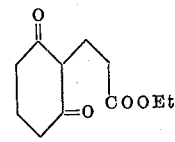

to give a compound of the structure

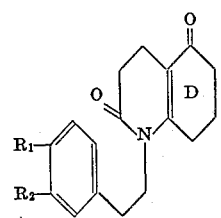

Step II is a reduction reaction of Ring D, of the compounds obtained in accordance with Step I. The reduction, for example, may be effected employing catalytic reducing agents such as gaseous hydrogen under pressure and palladium or carbon in an inert solvent such as alcohol. The reduction results in the formation of saturated Ring D of the structure

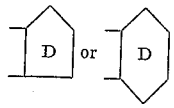

We have also found that when there is a keto group attached to Ring D the reduction of the double bond in Ring D also results in the reduction of the ketone to the corresponding alcohol such as

In the case where $R_3$ is hydrogen this reduction is preferably carried out in the presence of an alkali.

Step III involves the cyclization of the compounds obtained in accordance with Step II. The cyclization is effected by refluxing with a slight excess of phosphorus oxychloride to obtain compounds of the structure

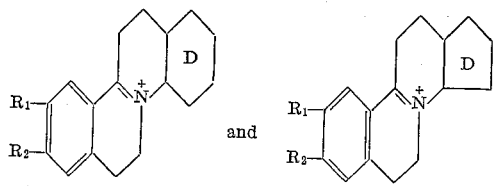

respectively.

When an —OH group is present on Ring D such as

it is desirable to protect the —OH group when the compound is cyclized. We have found that the —OH group may be protected by treating the parent compound bearing the —OH substituent with carboxylic acid anhydrides such as acetic anhydride, and after the cyclization has been completed the —OH group is restored by boiling with strong mineral acid. When the keto group is the desired substituent on Ring D, the corresponding alcohol as obtained in Step II may be treated with chromic anhydride in acetone. This treatment results in the conversion of the —OH group to a keto group.

Before cyclization the keto group may also be converted to a cyclic ketal group by treating a solution in benzene of the compound bearing the ketone substituent with ethylene glycol in the presence of an acid catalyst such as toluene sulfonic acid. The conversion of the hydroxy group to a ketone may also be effected after the cyclization of the parent compound by treatment of the hydroxy compound with chromic anhydride in acetone.

We have also found that compounds having a lower alkyl substituent such as methyl at position 13 may be produced, for example, by first condensing a substituted phenylalkylamine such as m-methoxyphenethylamine with a keto ester such as 2-methyl-2($\beta$-carboxyethyl)-3-carboxycyclopentanane to produce a compound of the formula:

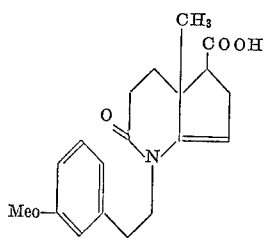

Said keto esters are prepared from 2-$R_3$-cycloalkane-1,3-diones which are in turn prepared according to the procedure of Panouse and Sannie, published in Bull. Soc. Chim. France, 1955, page 1036. The above intermediate is then cyclized by refluxing with phosphorus oxychloride to produce a compound of the structure

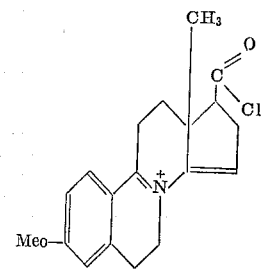

The order of Steps II and III are interchangeable in that reduction Step II may be preceded by the cyclization Step III which may then be followed by the reduction if the reduced product is desired. The order of the steps is not essential and is dependent on the ultimate product desired, although the reduction of Step II prior to Step III is preferable when $R_3$ is hydrogen. The acid chloride group introduced in the above example may serve as an intermediate to the preparation of many derivatives such as ester, amides, ketones, anhydrides, amines, alcohols, and the like.

We have also found that compounds such as III, IV, V, VIII, IX and X which contain a quaternary nitrogen atom can be reduced to the corresponding tertiary nitrogen by treatment with gaseous hydrogen in an inert solvent in the presence of a noble metal catalyst such as platinum or palladium on carbon.

In addition, we have also found that compounds wherein the substitutents $R_1$ and $R_2$ are lower alkoxy can be dealkylated employing hydrobromic or hydroiodic acids.

In quaternary salts such as II, two diasterioisomeric forms of this structure are possible depending upon the cis or trans fusion of the C and D rings. Each of these diasterioisomeric forms on reduction of its azomethine linkage will give rise to two additional diasterioisomeric forms depending upon the configuration of hydrogen atom at position 12a or 13a. All these four diasterioisomeric forms are capable of being resolved into optically active antipodes.

The foregoing reactions for the production of the 8-azasteroid nucleus is illustrated in the flow sheet which accompanies this application. Further transformations of the 8-azasteroid nucleus may be effected as described in the body of the specification.

The following examples are included in order further to illustrate the invention.

EXAMPLE 1

*1-(3,4-dimethoxyphenethyl)-3,4,7,8-tetrahydro-2,5-(1H,6H)-quinolinedione*

A mixture of 50 g. of 2-($\beta$-carbethoxyethyl)-1,3-cyclohexanedione and 42.5 g. of homoveratrylamine (0.235 mole of each) in 400 ml. xylene is refluxed for 6 hours. During this time 5.1 ml. of water is collected in a Dean-Stark trap. After the xylene is stripped the dark oil is taken up in chloroform and the chloroform solution is washed with 5% aqueous NaHCO$_3$ followed by 2 N HCl and water. The solution is dried over MgSO$_4$ and the chloroform removed by evaporation. The residual oil is vacuum distilled, B.P. 230–234°/.02 mm. The yellow oily distillate is dissolved in 100 ml. ethyl acetate. After cooling for 16–24 hours the reaction product 1-(3,4-dimethoxyphenethyl) - 3,4,7,8 - tetrahydro - 2,5(1H,6H) - quinolinedione precipitates out in the form of crystals, melting at 85 to 87° C.

EXAMPLE 2

*1,3,4,5,6,7-hexahydro-1-(m-methoxyphenethyl)-
2H-1-pyrindin-2-one*

In the same way as described in Example 1, 36.8 g. of 2-(β-carbethoxyethyl)cyclopentanone and 30.2 g. of m-methoxyphenethylamine react to give 45.8 g. of 1,3,4,5,6,7-hexahydro-1-(m-methoxyphenethyl)-2H-1-pyrindin-2-one in the form of a pale yellow oil, B.P. 199–202°/.25 mm.

EXAMPLE 3

*1-(3,4-dimethoxyphenethyl)-1,3,4,5,6,7-hexahydro-
2H-1-pyrindin-2-one*

In the same way as described in Example 1, 17.0 g. of 2-(β-carbomethoxyethyl)cyclopentanone and 18.1 g. of homoveratrylamine react to give 23 g. of 1-(3,4-dimethoxyphenethyl)-1,3,4,5,6,7-hexahydro-2H-1-pyrindin-2-one in the form of a pale yellow oil, B.P. 220–230°/.75 mm. which solidifies to a waxy yellow solid. This solid is recrystallized from ether to give a product, M.P. 104–105°.

EXAMPLE 4

*1-(3,4-dimethoxyphenethyl)-6,7-dihydro-1H-1-
pyrindine-2,5(3H,4H)-dione*

In the same way as described in Example 1, 2.2 g. of 2-(β-carboxyethyl)cyclopentane-1,3,-dione and 2.3 g. of homoveratrylamine react to give upon removal of the chloroform 3.8 g. of 1-(3,4-dimethoxyphenethyl)-6,7-dihydro-1H-1-pyrindine-2,5(3H,4H)-dione in the form of a tan solid which is recrystallized from acetonitrile, M.P. 159–161° C.

EXAMPLE 5

*1-(3,4-dimethoxyphenethyl)-3,4,4a,5,6,7-hexahydro-
4a-methyl-2(1H)-quinolone*

In the same way as described in Example 1, 10.0 g. of 2-(β-carbethoxyethyl)-2-methylcyclohexanone and 9.8 g. of homoveratrylamine react to give 16.3 g. of 1-(3,4-dimethoxyphenethyl)-3,4,4a,5,6,7-hexahydro-4a-methyl-2-(1H)-quinolone in the form of a pale yellow oil, B.P. 195–198°/.08 mm.

EXAMPLE 6

*1,3,4,4a,5,6-hexahydro-1-(3,4-dimethoxyphenethyl)-
4a-methyl-2H-1-pyrindin-2-one*

In the same way as described in Example 1, 29.0 g. of 2(β-carboxyethyl)-2-methyl-cyclopentanone and 31.8 g. of homoveratrylamine react to give 37.4 g. of 1,3,4,4a,5,6-hexahydro-1(3,4-dimethoxyphenethyl)-4a-methyl-2H-1-pyrindin-2-one in the form of a pale yellow oil, B.P. 192–195°/.08 mm.

EXAMPLE 7

*3,4,7,8-tetrahydro-1-(m-methoxyphenethyl)-2,5-
(1H,6H)-quinolinedione*

In the same way as described in Example 1, 10.6 g. of 2-(β-carbethoxyethyl)-1,3-cyclohexandeione and 7.55 g. of m-methoxyphenethylamine react to give 12 g. of 3,4,7,8-tetrahydro-1-(m-methoxyphenethyl)-2,5(1H,6H)-quinolinedione in the form of a pale yellow oil, B.P. 220–240°/.5 mm. which solidifies on rubbing with ethylacetate, M.P. 96–97° C. Recrystallization from ethylacetate-petroleum raises the M.P. to 97–98° C.

EXAMPLE 8

*3,4,6,7-tetrahydro-1-(m-methoxyphenethyl)-4a-methyl-
2,5(1H,4aH)-quinolinedione*

In the same way as described in Example 1, 6.8 g. of 2-(β-carbethoxyethyl)-2-methyl-1,3-cyclohexanedione and 4.5 g. of m-methoxyphenethylamine react to give 5.8 g. of 3,4,6,7-tetrahydro-1-(m-methoxyphenethyl)-4a-methyl-2,5(1H,4aH)-quinolinedione in the form of a light yellow oil, B.P. 220–225°/.1 mm.

EXAMPLE 9

*6,7-dihydro-1-(m-methoxyphenethyl)-1H-1-
pyrindine-2,5(3H,4H)-dione*

In the same way as described in Example 1, 7.85 g. of 2-(β-carboxyethyl)-1,3-cyclopentanedione and 6.98 g. of m-methoxyphenethylamine react to give 7.7 g. of 6,7-dihydro-1-(m-methoxyphenethyl)-1H-1-pyrindine-2,5-(3H,4H)-dione in the form of a pale yellow oil, B.P. 219–222°/.07 mm. This oil crystallizes spontaneously to tan crystals, M.P. 112–117° C. Recrystallization from ethylacetate raises the M.P. to 119–120° C.

EXAMPLE 10

*1-(3,4-dimethoxyphenethyl)-3,4,7,8-tetrahydro-
2,5(1H,6H)-quinolinedione*

A mixture of 50 g. of 2-(β-carbethoxyethyl)-1,3-cyclohexanedione and 42.5 g. of homoveratrylamine (0.235 mole of each) in 400 ml. of xylene is refluxed for 6 hours. During this time 5.1 ml. of water is collected in a Dean-Stark trap. The xylene is stripped; the dark oil remained is taken up in chloroform; and the chloroform solution is washed with 5% aqueous NaHCO₃, 2 N HCl and water. The solution is dried over MgSO₄, and the chloroform removed by evaporation. The residual oil is vacuum distilled, M.P. 230–234°/.22 mm. The yellow oily distillate is dissolved in 100 ml. of ethyl acetate. After cooling for 16–24 hours 1-(3,4-dimethoxyphenethyl)-3,4,7,8-tetrahydro-2,5(1H,6H)-quinolinedione in the form of crystals are formed, M.P. 85–87° C.

EXAMPLE 11

*1-(3,4-dimethoxyphenethyl)-octahydro-5-
hydroxy-2-(1H)-quinolone*

A solution of 23.4 g. of 1-(3,4-dimethoxyphenethyl)-3,4,7,8-tetrahydro-2,5(1H,6H)-quinolinedione in 200 ml. absolute alcohol containing 1.5 g. KOH is charged to the Parr hydrogenator and reduced over 4.0 g. 10% Pd-C at 20–26° C. and at an initial hydrogen pressure of 55 p.s.i. gauge. Hydrogen uptake ceases after about 6 hours. The catalyst is filtered and the filtrate is acidified with concentrated HCl to pH 3–4. The precipitated HCl is filtered and the filtrate stripped to an oil. The oil is dissolved in 400 ml. benzene and the cloudy solution dried over MgSO₄. The clear solution is evaporated to an oil. The oil is dissolved in about 50 ml. of ethyl acetate and scratched to induce crystallization. After 3 days at 4–6° C. with occasional scratching the compound 1-(3,4-dimethoxyphenethyl)-octahydro-5-hydroxy-2-(1H)-quinolone settles out as a white solid, M.P. 131–139° C. This material can be recrystallized from ethyl acetate or used as is.

EXAMPLE 12

*2,3,4,4a,6,7,11b,12,13,13a-decahydro-1-hydroxy-9,10-di-
methoxy-1H-dibenzo[a,f]quinolizine hydrobromide*

A solution of 3.6 g. of 1,2,3,4,4a,6,7,12,13,13a-decahydro-1-hydroxy-9,10-dimethoxy-dibenzo[a,f]quinolizium bromide in 100 ml. of hot ethanol is charged to the Parr hydrogenator over 0.5 g. PtO₂ catalyst and hydrogenated at 20–25° C. and at a hydrogen pressure of 55 p.s.i. gauge. Hydrogen absorption ceases after ½ hour. The reduction mixture is diluted with 50 ml. of water to dissolve some precipitated white solid. The catalyst is filtered and the filtrate is concentrated to dryness. The gummy residue is taken up in 20 ml. ethanol, diluted with 20 ml. ether and cooled for 16–24 hours. Filtration gives 2,3,4,4a,6,7,11b,12,13,13a-decahydro-1-hydroxy-9,10-dimethoxy-1H-dibenzo[a,f]quinolizine hydrobromide as a pale yellow crystal, M.P. 263–265° C.

EXAMPLE 13

*1,2,3,4,4a,6,7,12,13,13a-decahydro-9,10-dimethoxy-1-oxodibenzo[a,f]quinolizium perchlorate*

A solution of 5.0 g. of 1-(3,4-dimethoxyphenethyl) octahydro-5-hydroxy-2-(1H)quinolone in 500 ml. reagent grade acetone is cooled to 2°C. and treated all at once with vigorous stirring with 4.5 ml. of 8 N chromic anhydride in aqueous sulfuric acid. After stirring for 5 minutes at 2° C. 100 ml. of water are added, and the acetone is removed by distillation under reduced pressure. The green aqueous solution is extracted 4 times with benzene. The benzene solution is washed with 5% $NaHCO_3$ solution and water, dried, and treated with 5 ml. ethylene glycol and a few crystals of p-toluene sulfonic acid. This mixture is refluxed 4 hours under a Dean-Stark trap, then washed 2 times with 5% aqueous $NaHCO_3$ solution. The benzene solution is dried over $MgSO_4$ and treated with 25 ml. phosphorous oxychloride and refluxed for 1½ hours. The dark red solution is concentrated to dryness under vacuum, the oily residue dissolved in 2 N HCl and heated ½ hour on the steam bath. After cooling, the solution is treated slowly with 60% perchloric acid. The gummy precipitate is rubbed until solidification takes place. The yellow slurry is cooled for 16–24 hours and filtered to give 1,2,3,4,4a,6,7,12,13,13a-decahydro - 9,10 - dimethoxy-1-oxo-dibenzo[a,f]quinolizium perchlorate as a yellow solid, M.P. 206–209° C. The recrystallization product from 80% ethanol melts at 210–214° C.

EXAMPLE 14

*2,3,4,4a,5,6-hexahydro - 1 - (m-methoxyphenethyl)-4a-methyl-2-oxo-1H-1-pyrindine-5-carboxylic acid*

To a refluxing solution of 12.0 g. (.056 mole) of 2-methyl - 2-(β-carboxyethyl)-3-carboxycyclopentanone in 100 ml. xylene is added with stirring a solution of 8.5 g. (0.56 mole) of m-methoxyphenethylamine. The mixture is refluxed for 2 hours, during which time 1.8 ml. water are collected in a Dean-Stark trap (theory 2.02 ml.). The solution is cooled and the clear solution is extracted twice with 5% NaOH; the combined NaOH solutions are washed once with ether and acidified with concentrated HCl. The acidic solution is extracted three times with ethyl acetate and the combined ethyl acetate solutions are washed once with water, dried over $MgSO_4$ and evaporated to dryness. The oily residue is triturated with ether to give 2,3,4,4a,5,6-hexahydro-1-(m-methoxyphenethyl) 4a-methyl-2-oxo-1H-1-pyrindine-5-carboxylic acid in the form of crystals, M.P. 123–126° C. The product recrystallized from ethyl acetate melts at 125–127° C.

EXAMPLE 15

*1-(3,4dimethoxyphenethyl) - 2,3,4,4a,5,6 - hexahydro-4a-methyl-2-oxo-1H-1-pyrindine-5-carboxylic acid*

In the same way as described in Example 10, 21.4 g. of 2-(β - carboxyethyl)-2-methyl - 3 - carboxycyclopentanone and 18.1 g. of homoveratrylamine give 24.5 g. of 1-(3,4-dimethoxyphenethyl)-2,3,4,4a,5,6 - hexahydro-4a-methyl-2-oxo-1H-1-pyrindine-5-carboxylic acid in the form of a white solid, M.P. 153–156° C.

EXAMPLE 16

*1-(3,4-dimethoxyphenethyl)3,4,6,7-tetrahydro-4a-methyl-2,5-(1H,4aH)-quinolinedione*

A mixture of 22.6 g. of 2-(β-carbethoxyethyl)-2-methylcyclohexane-1,3-dione and 18.1 g. of homoveratrylamine in 330 ml. xylene is refluxed for 2 hours, 1.8 ml. of water being collected in a Dean-Stark trap. The xylene is removed by evaporation under reduced pressure and the oily residue taken up in benzene and placed on 1.7 kg. of alumina. The column is washed with 1 liter each of benzene, ether and a 20% solution of ethyl acetate in ether. The column is then washed with 3 liters of a 50% solution of ethyl acetate in ether. The solvent is removed from this fraction by evaporation. The pale yellow oil crystallizes on scratching and is recrystallized from ether to give 1-(3,4-dimethoxyphenethyl) 3,4,6,7 - tetrahydro - 4a - methyl-2,5(1H,4aH)-quinolinedione in the form of a white solid, M.P. 78–79° C.

EXAMPLE 17

*4,4a - dihydro-1-(m - methoxyphenethyl)-4a-methyl-1H-1-pyrindine-2,5-(3H,6H)-dione*

A solution of 45.5 g. of 2-(β-carboxyethyl)-2-methyl-1,3-cyclopentanedione and 37.8 g. of m-methoxyphenethylamine in 2.5 liters of methylene chloride is refluxed for 2½ hours under a modified Dean-Stark trap. A solution of 51.5 g. of dicyclohexylcarbodiimide in 100 ml. of methylene chloride is then added slowly. The resulting slurry is refluxed with stirring for 10 minutes, then cooled for 16–24 hours at 10° C. The slurry is filtered and the filtrate poured directly onto 3.75 kg. of alumina. The column is washed with 16 liters of methylene chloride and the solvent removed from this fraction to give 4,4a-dihydro - 1 - (m - methoxyphenethyl) - 4a - methyl-1H-1-pyrindine-2,5-(3H,6H)-dione in the form of a pale yellow oil.

EXAMPLE 18

*Octahydro-1-(m-methoxyphenethyl)-2H-1-pyrindine-2-one*

A solution of 13.85 g. of 1,3,4,5,6,7-hexahydro-1-(m-methoxyphenethyl)-2H-1-pyrindine - 2 - one in 100 ml. ethanol is shaken in a Parr bomb over 2.0 g. of 10% palladium on carbon catalyst at 20–25° C. and an initial hydrogen pressure of 50 p.s.i. gauge. Hydrogen absorption ceases after about 20 hours. The catalyst is removed by filtration and the ethanol is removed by distillation to obtain octahydro - 1 - (m - methoxyphenethyl) - 2H-1-pyrindine-2-one in the form of a colorless oil.

EXAMPLE 19

*1-(3,4-dimethoxyphenethyl)-octahydro-2H-1-pyrindine-2-one*

In the same way as described in Example 18, 21.3 g. of 1-(3,4-dimethoxyphenethyl) - 1,3,4,5,6,7 - hexahydro-2H - 1 - pyrindine - 2 - one on reduction gives 1-(3,4-dimethoxyphenethyl)-octahydro-2H-1-pyrindine - 2 - one in the form of a colorless oil which crystallizes on scratching. Recrystallization from ether gives white crystals, M.P. 76–78° C.

EXAMPLE 20

*1-(3,4-dimethoxyphenethyl)octahydro-4a-methyl-2(1H)-quinolone*

In the same way as described in Example 18, 10.0 g. of 1 - (3,4 - dimethoxyphenyl) - 3,4,4a,5,6,7 - hexahydro-4a - methyl -2(1H) -quinolone, on reduction gives 1-(3,4 - dimethoxyphenethyl) - octahydro - 4a - methyl-2(1H) - quinolone in the form of a colorless oil which solidifies on scratching and can be recrystallized from ether-petroleum-ether in the form of white crystals, M.P. 93–94° C.

EXAMPLE 21

*Octahydro-1-(3,4-dimethoxyphenethyl)-4a-methyl-2H-1-pyrindin-2-one*

In the same way as described in Example 18, 13.2 g. of 1,3,4,4a,5,6, - hexahydro - 1 - (3,4 - dimethoxyphenethyl) - 4a - methyl -2H - 1 - pyrindine - 2 -one on reduction gives octahydro - 1 - (3,4 - dimethoxyphenethyl)-4a - methyl - 2H - 1 - pyrindin - 2 - one in the form of a clear colorless oil.

EXAMPLE 22

*1-(3,4-dimethoxyphenethyl)tetrahydro-4a-methyl-1H-1-pyrindine-2,5(3H,6H)-dione*

In the same way as described in Example 18, 3.0 g. of 1 - (3,4 -dimethoxyphenethyl) - 4,4a - dihydro - 4a-methyl - 1H - 1 - pyridine - 2,5(3H,6H) - dione on reduction gives 1 - (3,4 - dimethoxyphenethyl)tetrahydro-4a - methyl -1H -1 pyrindine - 2,5(3H,6H) - dione in the form of a clear colorless oil.

EXAMPLE 23

*Tetrahydro-1-(m-methoxyphenethyl)-4a-methyl-1H-1-pyrindine-2,5(3H,6H)-dione*

In the same way as described in Example 18, 2.3 g. of 4,4a - dihydro - 1 - (m - methoxyphenethyl) - 4a - methyl-1H - 1 - pyrindine - 2,5(3H,6H) - dione on reduction gives tetrahydro - 1 - (m - methoxyphenethyl) - 4a-methyl - 1H - 1 - pyrindine - 2,5(3H,6H) - dione in the form of a clear, colorless oil.

EXAMPLE 24

*Octahydro-5-hydroxy-1-(m-methoxyphenethyl)-2H-1-pyrindin-2-one*

In the same was as described in Example 18, 5.6 g. of 6,7 - dihydro - 1 - (m - methoxyphenethyl) - 1H - pyrindine - 2,5(3H,4H) - dione on reduction gives octahydro-5 - hydroxy - 1 - (m - methoxyphenethyl) - 2H - 1 - pyrindin - 2 - one in the form of a white solid which is recrystallized from ethyl acetate to M.P. 130–131° C.

EXAMPLE 25

*1-(3,4-dimethoxyphenethyl)octahydro-4a-methyl-2-oxo-1H-1-pyrindine-5-carboxylic acid*

A solution of 2.0 g. of 1 - (3,4 - dimethoxyphenethyl)-2,3,4,4a,5,6 - hexahydro - 4a - methyl - 2 -oxo - 1H - 1-pyrindine - 5 - carboxylic acid in 50 ml. of glacial acetic acid is shaken in a Parr bomb over 0.5 g. platinum oxide catalyst at 20–25°C. and an initial hydrogen pressure of 50 p.s.i. gauge. Hydrogen absorption ceases after 4 hours. The catalyst is removed by filtration and the solvent is removed by distillation under reduced pressure to obtain 1 - (3,4 - dimethoxyphenethyl)octahydro - 4a - methyl-2 - oxo - 1H - 1 - pyrindine - 5 - carboxylic acid in the form of a solid residue. The recrystallized form from ethyl acetate melts at 169–170° C.

EXAMPLE 26

*Octahydro-1-(m-methoxyphenethyl)-4a-methyl-2-oxo-1H-1-pyrindine-5-carboxylic acid*

In the same way as described in Example 25, 2.0 g. of 2,3,4,4a,5,6 - hexahydro - 1 - (methoxyphenethyl) - 4a-methyl - 2 -oxo - 1H - 1 - pyrindine - 5 - carboxylic acid on reduction gives octahydro - 1 - (m - methoxyphenethyl) - 4a - methyl - 2 -oxo - 1H - 1 - pyrindine - 5-carboxylic acid in the form of a solid residue which after recrystallization from ethyl acetate melts at 173–174° C.

EXAMPLE 27

*Octahydro-5-hydroxy-1-(m-methoxyphenethyl)-2(1H)-quinolone*

In the same way as described in Example 25, 6.1 g. of 3,4,7,8 - tetrahydro - 1 - (m - methoxyphenethyl) - 2,5 (1H,6H) - quinoline - dione gives upon removal of solvent octahydro - 5 - hydroxy - 1 - (m - methoxyphenethyl) - 2(1H) -quinolone in the form of a colorless oil.

EXAMPLE 28

*Octahydro-5-hydroxy-1-(m-methoxyphenethyl)-2(1H)-quinolone acetate*

A solution of 6.1 g. of octahydro -5 - hydroxy - 1-(m - methoxyphenethyl) - 2(1H) - quinolone in a mixture of 75 ml. pyridine and 20 ml. acetic anhydride is left for 16–24 hours at 20–25°C. The mixture is evaporated under high vacuum to remove excess pyridine and acetic anhydride to obtain octahydro - 5 - hydroxy - 1 - (m - methoxyphenethyl) - 2(1H) - quinolone acetate in the form of pale yellow oil.

EXAMPLE 29

*1-(3,4-dimethoxyphenethyl)octahydro-5-hydroxy-2(1H)-quinolone acetate*

In the same way as Example 28, 7.4 g. of 1 - (3,4-dimethoxyphenethyl)octahydro - 5 -hydroxy - 2(1H)-quinolone gives 1-(3,4-dimethoxyphenethyl)octahydro-5-hydroxy-2(1H)-quinolone acetate in the form of a pale yellow oil.

EXAMPLE 30

*1-(3,4-dimethoxyphenethyl)hexahydro-2,5 (1H,6H)-quinolinedione*

A solution of 5.0 g. of 1 - (3,4 - dimethoxyphenethyl)-octahydro - 5 - hydroxy - 2(1H) - quinolone in 550 ml. reagent grade acetone is treated all at once at 12° C. with rapid stirring to 4.5 ml. of 8 N chromic anhydride in sulfuric acid. A green slurry is formed which is stirred 10 minutes, then diluted with 30 ml. water. The acetone is removed by distillation, and the green aqueous solution is extracted 3 times with 50 ml. portions of benzene. The benzene solution is washed with a 5% aqueous solution of sodium bicarbonate, dried and the benzene is evaporated to obtain 1 - (3,4 - dimethoxyphenethyl)hexahydro - 2,5 (1H,6H) - quinolinedione as a yellow oil. The yellow oil can be recrystallized from a mixture of ethyl acetate and ether. The recrystallized form melts at 124–126° C.

EXAMPLE 31

*Hexahydro-1-(m-methoxyphenethyl)-2,5 (1H,4aH)-quinolinedione*

In the same way as described in Example 30, 7.0 g. of octahydro - 5 - hydroxy - 1 - (m - methoxyphenethyl)-2(1H) - quinolone gives hexahydro - 1 - (m - methoxyphenethyl) - 2,5(1H,4aH) - quinolinedione in the form of a pale yellow oil.

EXAMPLE 32

*1-(3,4-dimethoxyphenethyl)-5,5-ethylenedioxy-octahydro-4a-methyl-2H-1-pyrindin-2-one*

A solution of 3.0 g. of 1-(3,4-dimethoxyphenethyl)-tetrahydro-4a-methyl-1H-1pyrindine-2,5(3H,6H) - dione in 50 ml. benzene containing 2.0 ml. of ethylene glycol and 0.1 g. of p-toluene-sulfonic acid is refluxed for 5 hours under a Dean-Stark trap. The solution is washed twice with a 5% aqueous solution of sodium bicarbonate, dried, and the benzene is removed by distillation to give 1-(3,4-dimethoxyphenethyl) - 5,5 - ethylenedioxy - octahydro-4a-methyl-2H-1-pyrindin-2-one in the form of a pale yellow oil.

EXAMPLE 33

*1-(3,4-dimethoxyphenethyl)-5,5-ethylenedioxy-octahydro-2(1H)-quinolone*

In the same way as described in Example 32, 1.0 g. of 1-(3,4 - dimethoxyphenethyl) - hexahydro - 2,5(1H,6H)-quinolinedione gives 1-(3,4 - dimethoxyphenethyl) - 5,5-ethylenedioxy-octahydro-2(1H)-quinolone in the form of a pale yellow oil.

EXAMPLE 34

*5,5-ethylenedioxyoctahydro-1-(m-methoxyphenethyl)-4a-methyl-2H-1-pyrindine-2-one*

In the same way as described in Example 32, 1.3 g. of tetrahydro-1-(m-methoxyphenyl) - 4a - methyl - 1H-1-pyrindine-2,5(3H,6H)-dione gives 5,5 - ethylenedioxy-octahydro - 1 - (m-methoxyphenyl) - 4a-methyl - 2H-1-pyrindine-2-one in the form of a pale yellow oil.

EXAMPLE 35

*2,3,3a,5,6,11,12,12a-octahydro-8,9-dimethoxy-1H-benzo[a]-cyclopenta[f]quinolizinium dichlorophosphate*

To a solution of 6.0 g. of 1-(3,4-dimethoxyphenethyl)-octahydro-2H-1-pyrindin-2-one in 90 ml. benzene is added 24 ml. phosphorous oxychloride and the solution refluxed for 1½ hours. The solution is cooled, diluted with 300 ml. petroleum ether, left 2 hours at 20–25° C. to obtain 2,3,3a,5,6,11,12,12a-octahydro-8,9-dimethoxy - 1H - benzo[a]cyclopenta[f]quinolizinium dichlorophosphate in the form of a precipitated solid. It is recrystallized from cold ethanol and ether to M.P. 147–148° C.

EXAMPLE 36

*2,3,5,6,11,12-hexahydro-8,9-dimethoxy-1H-benzo[a]-cyclopenta-[f]quinolizinium dichlorophosphate*

To a solution of 12 g. of 1-(3,4-dimethoxyphenethyl)-1,3,4,5,6,7-hexahydro-2H-1-pyrindin - 2 - one in 180 ml. benzene is added 48 ml. phosphorous oxychloride and the solution refluxed for 2 hours. The solution is cooled, diluted with 500 ml. petroleum ether, left at 20–25° C. for 16–24 hours. The precipitated oil is dissolved in 20 ml. acetone, scratched to induce crystallization and the slurry filtered to obtain 2,3,5,6,11,12-hexahydro-8,9-dimethoxy - 1H - benzo[a]cylopenta[f]quinolizinium dichlorophosphate in the form of a yellow solid which after recrystallization from isopropyl alcohol melts at 149–156° C.

EXAMPLE 37

*2,3,5,6,11,12-hexahydro-8-methoxy-1H-benzo[a]-cyclopenta[f]quinolizinium dichlorophosphate*

In the same way as described in Example 36, 12 g. of 1,3,4,5,6,7-hexahydro-1-(m - methoxyphenethyl) - 2H-1-pyrindin-2-one gives after recrystallization from acetone 2,3,5,6,11,12-hexahydro-8-methoxy - 1H - benzo[a]cyclopenta[f]quinolizinium dichlorophosphate in the form of off-white crystals, M.P. 179–181° C.

EXAMPLE 38

*2,3,3a,5,6,11,12,12a-octahydro-8-methoxy - 12a - methyl-1-chlorocarbonyl - 1H - benzo[a]cyclopenta[f]quinolizinium dichlorophosphate*

A solution of 5.0 g. of octahydro-1-(m-methoxyphenethyl)-4a-methyl-2-oxo-1H-1-pyrindine - 5-carboxylic acid in 50 ml. of phosphorous oxychloride is heated 2 hours at 100° C. and evaporated to obtain 2,3,3a,5,6,11,12,12a-octahydro-8-methoxy-12a-methyl - 1 - chlorocarbonyl-1H-benzo[a]cyclopenta[f]quinolizinium dichlorophosphate as an oily residue. The oil is washed thoroughly with petroleum ether.

EXAMPLE 39

*2,5,6,11,12,12a-hexahydro-8,9-dimethoxy - 12a - methyl-1-carboxy - 1H - benzo[a]cyclopenta[f]quinolizinium perchlorate*

In the same way as described in Example 38,, 4.5 g. of 1-(3,4-dimethoxyphenethyl - 2,3,4,4a,5,6 - hexahydro-4a-methyl-2-oxo-1H-1-pyrindine - 5 - carboxylic acid gives after reaction 2,5,6,11,12,12a-hexahydro - 8,9-dimethoxy-12a-methyl-1-carboxy - 1H - benzo[a]cyclopenta[f]quinolizinium perchloride in the form of a yellow crystalline salt which is recrystallized from ethanol-ether to a M.P. of 218–220° C.

EXAMPLE 40

*1,2,5,6,12,12a-hexahydro-8,9-dimethoxy-12a-methyl-1-carbethoxy-benzo[a]cyclopenta[f]quinolizine*

To a solution of 12 g. of 1-(3,4-dimethoxyphenethyl)-2,3,4,4a,5,6-hexahydro-4a-methyl-2-oxo-1H-1 - pyrindine-5-carboxylic acid in 150 ml. benzene is added 50 ml. phosphorous oxychloride and the mixture is refluxed for 2 hours and cooled. The precipitate is filtered and dissolved in absolute ethanol and refluxed for one hour. The solution is cooled and 200 ml. of 5% sodium hydroxide solution is added. The precipitate is filtered, washed with water and recrystallized from ethanol to obtain 1,2,5,6,-12,12a-hexahydro-8,9-dimethoxy-12a-methyl - 1 - carbethoxy-benzo[a]cyclopenta[f]quinolizine melting at 140–144° C.

EXAMPLE 41

*1,2,5,6,12,12a-hexahydro-8,9-dimethoxy - 12a - methyl-1 - (N,N - diethylcarbamoyl)benzo[a]cyclopenta[f]-quinolizine*

A solution of 1.0 g. of 2,5,6,11,12,12a-hexahydro-8,9-dimethoxy-12a-methyl-1-chlorocarbonyl - 1H - benzo[a]-cyclopenta[f]quinolizinium dichlorophophate in 25 ml. diethylamine is refluxed 15 minutes and evaporated to an oil. Water is added to the residue and the solid is filtered and recrystallized from ethanol-water to give 1,2,-5,6,12,12a-hexahydro-8,9-dimethoxy - 12a - methyl - 1-(N,N - diethylcarbamoyl)benzo[a]cyclopenta[f]quinolizine melting at 97–99° C.

EXAMPLE 42

*2,3,3a,5,6,11,12,12a - octahydro-8,9-dimethoxy-12a-methyl-1-oxo-1H-benzo[a]cyclopenta[f]quinolizinium perchlorate*

A solution of 3.0 g. of 1-(3,4-dimethoxyphenethyl)-tetrahydro-4a-methyl-1H-1-pyrindine - 2,5(3H,6H)-dione in a mixture of 70 ml. benzene and 10 ml. phosphorous oxychloride is refluxed 15 minutes, then evaporated to an oil. The oil is taken up in water and a 10% solution of perchloric acid added slowly until precipitation is complete. The slurry is cooled for 20 hours at 10° to obtain 2,3,3a,5,6,11,12,12a-octahydro-8,9 - dimethoxy-12a-methyl-1-oxo-1H-benzo[a]cyclopenta[f]quinolizinium perchlorate in the form of a yellow solid. The recrystallized form from ethanol-ether melts at 217–220° C.

EXAMPLE 43

*2,5,6,11,12,12a-hexahydro - 8,9-dimethoxy-12a-methyl-1-oxo-1H-benzo[a]cyclopenta[f]quinolizinium perchlorate*

In the same way as described in Example 42, 0.2 g. of 1-1-(3,4-dimethoxyphenethyl) - 4,4a-dihydro-4a - methyl-1H-1-pyrindine - 2,5(3H,6H)-dione gives 2,5,6,11,12,12a-hexahydro-8,9 - dimethoxy-12a-methyl - 1-oxo-1H-benzo[a]cyclopenta[f]quinolizinium perchlorate in the form of a yellow solid which after recrystallization from methanol-ether gives M.P. 242–245° C.

EXAMPLE 44

*2,5,6,11,12,12a-hexahydro-8,9-dimethoxy - 12a-methyl-1-chlorocarbonyl-1H - benzo[a]cyclopenta[f]quinolizinium dichlorophosphate*

A solution of 5.0 g. of 1-(3,4-dimethoxyphenethyl)-2,3,4,4a,5,6-hexahydro-4a - methyl-2-oxo-1H-1-pyrindine-5-carboxylic acid in a mixture of 100 ml. of benzene and 25 ml. phosphorous oxychloride is refluxed 2 hours and cooled to obtain 2,5,6,11,12,12a-hexahydro-8,9-dimethoxy-12a-methyl-1-chlorocarbonyl - 1H-benzo[a]cyclopenta[f]quinolizium dichlorophosphate in the form of crystals.

EXAMPLE 45

*2,5,6,11,12,12a-hexahydro-8-methoxy - 12a-methyl-1-chlorocarbonyl - 1H - benzo[a]cyclopenta[f]quinolizinium dichlorophosphate*

A solution of 17.5 g. of 2,3,4,4a,5,6-hexahydro-1-(m-methoxyphenethyl) - 4a-methyl-2-oxo-1H-1-pyrindine-5-carboxylic acid in 150 ml. phosphorous oxychloride is heated 3 hours at 100° C. and evaporated under reduced pressure to obtain 2,5,6,11,12,12a-hexahydro-8-methoxy-12a - methyl-1-chlorocarbonyl-1H-benzo[a]cyclopenta[f] quinolizinium dichlorophosphate in the form of an oil.

EXAMPLE 46

2(13a),3,4,4a,6,7,12,13-octahydro-9,10-dimethoxydibenzo[a,f]-quinolizinium perchlorate

To a solution of 0.5 g. of 1-(3,4-dimethoxyphenethyl)-octahydro-5-hydroxy-2(1H)-quinolone in 10 ml. benzene is added 2 ml. phosphorous oxychloride. The mixture is refluxed for 2 hours, evaporated to an oil and the oil is dissolved in water. The aqueous solution is treated dropwise with a 10% aqueous solution of perchloric acid until precipitation is complete to obtain 2(13a),3,4,4a,6,7,12,13-octahydro-9,10 - dimethoxydibenzo[a,f]quinolizinium perchlorate. The perchlorate salt is filtered and can be recrystallized from methanol to M.P. 223–225° C.

EXAMPLE 47

1,2,3,4,4a,6,7,12,13,13a-decahydro-1-acetoxy-9,10-dimethoxy-dibenzo[a,f]quinolizinium perchlorate

In the same way as described in Example 46, 0.25 g. of 1-(3,4-dimethoxyphenethyl) - octahydro-5-hydroxy-2 (1H)-quinolone acetate gives the yellow perchlorate salt 1,2,3,4,4a,6,7,12,13,13a - decahydro-1-acetoxy - 9,10- dimethoxydibenzo[a,f]quinolizinium perchlorate which can be recrystallized from methanol to yellow needles, M.P. 246.5–248° C.

EXAMPLE 48

2,3,4,4a,6,7,13,13a-octahydro-9,10-dimethoxy-13a-methyl-1H-dibenzo[a,f]quinolizine

A solution of 10 g. of 1-(3,4,-dimethoxyphenethyl)-octahydro-4a-methyl-2(1H)-quinolone in a mixture of 120 ml. benzene and 30 ml. phosphorous oxychloride is refluxed for 2 hours and then evaporated to an oil. The oil is dissolved in water and a 10% aqueous solution of perchloric acid added slowly until precipitation is complete. The perchlorate salt is filtered and recrystallized from methanol to give yellow crystals, M.P. 203–204° C. The perchlorate salt is dissolved in 250 ml. methanol, cooled to 10° C. and 40 ml. of 5% NaOH solution added. The precipitated base is filtered and recrystallized from methanol to give 2,3,4,4a,6,7,13,13a-octahydro-9,10-dimethoxy-13a-methyl-1H-dibenzo[a,f]quinolizine in the form of white crystals, M.P. 139–141° C.

EXAMPLE 49

1,2,3,6,7,12,13,13a-octahydro - 9,10-dimethoxy-1-oxo-13a-methyldibenzo[a,f]quinolizinium dichlorophosphate

A solution of 1.8 g. of 1-(3,4-dimethoxyphenethyl)-3,4,6,7 - tetrahydro-4a-methyl - 2,5(1H,4aH)-quinolinedione in a mixture of 70 ml. benzene and 7 ml. phosphorous oxychloride is refluxed for 1½ hours. The precipitated yellow solid is filtered and recrystallized from cold methanol-ether to obtain 1,2,3,6,7,12,13,13a-octahydro-9,10-dimethoxy-1-oxo-13a - methyldibenzo[a,f]quinolizinium dichlorophosphate in the form of bright yellow crystals, M.P. 166–168° C.

EXAMPLE 50

2,3,3a,5,6,11,12,12a-octahydro - 8,9-dimethoxy-12a-methyl-1H-benzo[a]cyclopenta[f]quinolizinium iodide

A solution of 37.4 g. of octahydro-1-(3,4-dimethoxyphenethyl)-4a-methyl-2H-1-pyrindin-2-one in a mixture of 350 ml. benzene and 100 ml. phosphorous oxychloride is refluxed 2 hours and concentrated to an oil. The oil is dissolved in 100 ml. methanol and 250 ml. of 20% sodium hydroxide solution is added slowly with cooling. The slurry is cooled 2 hours at 10° C. and the solid is filtered. The residue is dissolved in an excess of 10% aqueous hydriodic acid and the solution evaporated in reduced pressure to obtain 2,3,3a,5,6,11,12,12a-octahydro-8,9-dimethoxy-12a - methyl-1H - benzo[a]cyclopenta[f] quinolizinium iodide in the form of an oil. The oil crystallizes on rubbing with isopropyl alcohol and is recrystallized from methanol-ether to give yellow crystals, M.P. 205–207° C.

EXAMPLE 51

1,2,5,6,12,12a-hexahydro-8-methoxy-12a-methyl-1-carbethoxybenzo[a]cyclopenta[f]quinolizine

A solution of 1.0 g. of 2,5,6,11,12,12a-hexahydro-8-methoxy-12a-methyl - 1 - chlorocarbonyl-1H-benzo[a]cyclopenta[f]quinolizinium dichlorophosphate in 15 ml. absolute ethanol is refluxed ½ hour and evaporated to an oil. The oil is taken up in water and 20 ml. of 20% sodium hydroxide solution added. The gummy precipitate crystallizes on rubbing with ethanol. The solid is filtered and recrystallized from ethanol to give 1,2,5,6,12,12a-hexahydro-8-methoxy-12a-methyl-1 - carbethoxybenzo[a]cyclopenta[f]quinolizine, M.P. 92–93° C.

EXAMPLE 52

1,2,3,3a,5,6,12,12a-octahydro-8-methoxy-12a-methyl-1-carbethoxybenzo[a]cyclopenta[f]quinolizine

A solution of 5.0 g. of 2,3,3a,5,6,11,12,12a-octahydro-8-methoxy-12a-methyl - 1 - chlorocarbonyl-1H-benzo[a] cyclopenta[f]quinolizinium dichlorophosphate in 75 ml. of absolute ethanol is maintained at reflux for one hour and is worked up as in Example 51 to give 1,2,3,3a,5,6, 12,12a-octahydro-8-methoxy - 12a - methyl-1-carbethoxy-benzo[a]cyclopenta[f]quinolizine in the form of white crystals, M.P. 109–110° C.

EXAMPLE 53

1,2,3,4,4a,6,7,12,13,13a-decahydro-1-hydroxy-9-methoxybenzo[a,f]quinolizinium bromide

A solution of 1.0 g. of octahydro-5-acetoxy-1{m-methoxyphenethyl)-2(1H)-quinolone is refluxed for 3 hours with 50 ml. of 2 N hydrobromic acid. The solution is evaporated to dryness. The residue crystallizes from isopropanol to give 1,2,3,4,4a,6,7,12,13,13a-decahydro-1-hydroxy - 9 - methoxydibenzo[a,f]quinolizinium bromide in the form of a yellow solid which is recrystallized from methanol-ether, M.P. 219–220° C.

EXAMPLE 54

1,2,3,4,4a,6,7,12,13,13a-decahydro-9-methoxy-1-oxo-dibenzo[a,f]quinolizinium bromide

A solution of 55.5 g. of 1,2,3,4,4a,6,7,12,13,13a-decahydro-1-hydroxy - 9 - methoxydibenzo[a,f]quinolizinium perchlorate in 4 liters of reagent grade acetone at 2° C. is treated over a 5 minute period with rapid stirring with 82 ml. of 8 N chromic anhydride in sulfuric acid. After addition is complete the mixture is stirred for 5 minutes. A rapid stream of gaseous sulfur dioxide is passed through the mixture until precipitation of chromic salts is complete. The mixture is filtered and the acetone removed by evaporation. The oily residue is dissolved in 3 liters of hot water, cooled to 50° C. and poured into a slurry of ice and 500 ml. of 50% sodium hydroxide solution. The precipitated oil is extracted with 250 ml. portions of methylene chloride. The combined extracts are dried over magnesium sulfate and dry hydrogen bromide passed in until precipitation of the yellow oil is complete. The methylene chloride is evaporated and the oily residue dissolved in 100 ml. isopropyl alcohol and cooled for 72 hours to obtain 1,2,3,4,4a,6,7,12,13,13a-decahydro-9-methoxy-1-oxodibenzo[a,f]quinolizinium bromide in the form of a yellow solid. The recrystallized form from ethanol-ether melts at 210–212° C.

EXAMPLE 55

2,5,6,11,12,12a-hexahydro-8-methoxy-1-oxo-12a-methyl-1H-benzo[a]cyclopenta[f]quinolizium perchlorate

A solution of 0.7 g. of 4,4a-dihydro-1-(m-methoxyphenethyl) - 4a - methyl-1H-1-pyrindine-2,5(3H,6H)-dione in a mixture of 27 ml. benzene and 2.7 ml. phosphorous oxychloride is refluxed 1½ hours. The mixture is decanted from the precipitated black tar and evaporated to an oil. The oil is boiled with 10 ml. water, cooled and decanted from more insoluble gum. The aqueous solution is treated with a 10% solution of perchloric acid until precipitation of the oil is complete. The oil crystallizes on rubbing with isopropyl alcohol and is recrystallized from isopropyl alcohol to obtain 2,5,6,11,12,12a-hexahydro-8-methoxy-1-oxo-12a-methyl - 1H - benzo[a]cyclopenta[f] quinolizium perchlorate, M.P. 200–204° C.

EXAMPLE 56

*2,3,3a,5,6,11,12,12a-octahydro-8-methoxy - 1 - oxo - 12a-methyl - 1H - benzo[a]cyclopenta[f]quinolizinium bromide*

A solution of 3.9 g. of tetrahydro-1-(m-methoxyphenethyl)-4a-methyl-1H-1-pyrindine-2,5(3H,6H)-dione in 30 ml. benzene is refluxed with 13 ml. phosphorous oxychloride for 15 minutes. The benzene and phosphorous oxychloride are removed and the residual red oil dissolved by heating in 25 ml. water. After cooling, the solution is extracted with ether and the yellow aqueous solution cooled and made basic with dilute sodium hydroxide. The oily precipitate is extracted with ether and dry gaseous hydrogen bromide is passed through the ethereal extract. The oily quaternary bromide solidifies on rubbing with acetonitrile to give 2,3,3a,5,6,11,12,12a-octahydro-8-methoxy-1-oxo-12a-methyl - 1H - benzo[a]cyclopenta[f] quinolizinium bromide in the form of yellow needles. After recrystallization from ethylacetate-acetonitrile the product melts at 211–213° C.

EXAMPLE 57

*1,2,3,6,7,12,13,13a-octahydro-9,10-dimethoxy-13a-methyldibenzo[a,f]quinolizinium bromide*

In the same way as described in Example 56, 20 g. of 1-(3,4-dimethoxyphenethyl)3,4,4a,5,6,7 - hexahydro - 4a-methyl-2(1H) - quinolone gives 1,2,3,6,7,12,13,13a-octahydro - 9,10 - dimethoxy - 13a-methyldibenzo[a,f]quinolizinium bromide in the form of a yellow solid which after recrystallization from isopropyl alcohol-ether melts at 173–174° C.

EXAMPLE 58

*1,2,3,3a,5,6,10b,11,12,12a-decahydro-8,9-dimethoxy-benzo[a]cyclopenta[f]quinolizine hydrobromide*

A solution of 14 g. of 2,3,3a,5,6,11,12,12a-octahydro-8,9 - dimethoxy-1H-benzo[a]cyclopenta[f]quinolizinium dichlorophosphate in 200 ml. ethanol is shaken in a Parr bomb over 1.0 g. of platinum oxide catalyst at 20–25° C. and 50 p.s.i. gauge hydrogen pressure. Hydrogen uptake ceases after ½ hour. The catalyst is filtered and the solvent removed by evaporation and the residue is taken up in 300 ml. water. This is made basic with a 5% aqueous solution of sodium hydroxide and the precipitate filtered and recrystallized from aqueous ethanol to obtain 1,2,3,3a,5,6,10b,11,12,12a - decahydro - 8,9 - dimethoxybenzo[a]cyclopenta[f]quinolizine, M.P. 115–116° C. The free base may be converted into its hydrobromide salt by dissolving the base in ether and passing dry, gaseous hydrogen bromide through the solution until precipitation is complete. The hydrobromide salt can be recrystallized from ethanol-ether to a M.P. 286–287° C.

EXAMPLE 59

*1,2,3,3a,5,6,10b,11,12,12a-decahydro - 8 - methoxybenzo [a]-cyclopenta[f]quinolizine hydrobromide*

In the same way as described in Example 58, 16 g. of 2,3,3a,5,6,11,12,12a-octahydro-8-methoxy - 1H-benzo[a] cyclopenta[f]quinolizinium bromide after reduction gives 1,2,3,3a,5,6,10b,11,12,12a-decahydro - 8-methoxybenzo[a] cyclopenta[f]quinolizine hydrobromide as a white crystalline salt which after recrystallization from methanol, melts at 260–262° C.

EXAMPLE 60

*3,3a,5,6,10b,11,12,12a-octahydro - 8,9 - dimethoxy - 12a-methylbenzo[a]cyclopenta[f]quinolizin-1(2H)-one*

In the same way as described in Example 58, 0.85 g. of 2,3,3a,5,6,11,12,12a - octahydro - 8,9 - dimethoxy-12a-methyl-1-oxo - 1H - benzo[a]cyclopenta[f]quinolizinium perchlorate gives 3,3a,5,6,10b,11,12,12a-octahydro-8,9-dimethoxy-12a - methylbenzo[a]cyclopenta[f]quinolizin-1 (2H)-one in the form of a solid which, after purification by chromatography over alumina melts at 140–141° C.

EXAMPLE 61

*3,3a,5,6,10b,11,12,12a - octahydro - 8 - methoxy - 12a-methylbenzo[a]cyclopenta[f]quinolizin-1(2H)- one hydrobromide*

In the same way as described in Example 58, 16.8 g. of 2,3,3a,5,6,11,12,12a - octahydro-8-methoxy-1-oxo-12a-methyl-1H-benzo[a]cyclopenta[f]quinolizinium bromide is reduced in methanol to give after recrystallization from methanol 3,3a,5,6,10b,11,12,12a - octahydro-8-methoxy-12a-methylbenzo[a]cyclopenta[f]quinolizin - 1(2H)-one hydrobromide as a white crystalline salt, M.P. 280–282° C.

EXAMPLE 62

*1,2,3,3a,5,6,10b,11,12,12a - decahydro - 8,9 - dimethoxy-12a - methyl - 1 - carbomethoxybenzo[a]cyclopenta[f] quinolizine*

A suspension of 1.0 g. of 1,2,5,6,12,12a-hexahydro-8,9 - dimethoxy-12a-methyl-1-carbomethoxybenzo[a]cyclopenta[f]quinolizine in 100 ml. of ethanol is treated with dry hydrogen chloride to give a clear solution. This resulting solution is shaken in the Parr bomb over 0.25 g. of platinum oxide catalyst at room temperature and 50 p.s.i. gauge of hydrogen pressure. Hydrogen uptake ceases after ½ hour. The catalyst is filtered and the filtrate is evaporated to an oil. The oil is taken up in water and made basic with a 5% solution of sodium hydroxide to obtain 1,2,3,3a,5,6,10b,11,12,12a - decahydro - 8,9 - dimethoxy-12a - methyl - 1 - carbomethoxybenzo[a]cyclopenta[f]quinolizine in the form of a precipitate. The precipitate is filtered and recrystallized from ethanol, M.P. 153–154° C.

EXAMPLE 63

*1,2,3,3a,5,6,10b,11,12,12a-decahydro - 8 - methoxy - 12a-methyl-1 - carbethoxybenzo[a]cyclopenta[f]quinolizine hydrochloride*

In the same way as described in Example 62, 1.0 g. of 1,2,5,6,12,12a-hexahydro-8-methoxy-12a-methyl-1-carbethoxybenzo[a]cyclopenta[f]quinolizine after reduction and treatment with hydrogen chloride gives 1,2,3,3a,5,6, 10b,11,12,12a-decahydro-8-methoxy - 12a-methyl-1-carbethoxybenzo[a]cyclopenta[f]quinolizine hydrochloride as a white crystalline salt which, after recrystallization from ethanol-ether melts at 204–205° C.

EXAMPLE 64

*2,3,4,4a,6,7,11b,12,13,13a-decahydro-8,10-dimethoxy-1-oxo-1H-dibenzo[a,f]quinolizine hydrobromide*

A solution of 0.5 g. of 1,2,3,4,4a,6,7,12,13,13a-decahydro-9,10-dimethoxy-1-oxodibenzo[a,f]quinolizinium bromide in 50 m l. of 80% ethanol is basified to pH 9 by the addition of 20% sodium hydroxide solution. The mixture is shaken in the Parr bomb over 0.5 g. of 10% palladium carbon catalyst at room temperature and 50 p.s.i gauge of hydrogen pressure. Hydrogen absorption is complete in 10 minutes. The catalyst is filtered and the filtrate is evaporated to an oil. The oil is partitioned between 10 ml. of water and 50 ml. of ether and the layers are separated. The ether layer is dried and dry gaseous hydrogen bromide passed in. The resulting gummy precipitate is dissolved in 5 ml. of methanol, a little ether is added and the solution is cooled to obtain 2,3,4,4a,6,7,11b,12,13,13a-decahydro-9,10-dimethoxy - 1 - oxo-1H-dibenzo[a,f]quinolizine hydrobromide as a crystalline salt. The hydrobromide salt thus obtained is recrystallized from methanol-ether, M.P. 207–210° C.

EXAMPLE 65

*2,3,4,4a,6,7,11b,12,13,13a-decahydro - 9,10 - dimethoxy-1-oxo-13a-methyl - 1H - dibenzo[a,f]quinolizine hydrobromide*

In the same way as described in Example 64, 1.0 g. of 1,2,3,6,7,12,13,13a-octahydro - 9,10 - dimethoxy-1-oxo-13a-methyl-dibenzo[a,f]quinolizinium dichlorophosphate gives 2,3,4,4a,6,7,11b,12,13,13a-decahydro - 9,10 - dimethoxy-1-oxo-13a-methyl-1H-dibenzo[a,f]quinolizine hydrobromide as an off-white hydrobromide salt, M.P. 221–223° C.

EXAMPLE 66

*2,3,4,4a,6,7,11b,12,13,13a-decahydro-9-methoxy-1-oxo-1H-dibenzo-[a,f]quinolizine hydrobromide*

In the same way as described in Example 64, 0.6 g. of 1,2,3,4,4a,6,7,12,13,13a-decahydro-9-methoxy - 1 - oxodibenzo[a,f]quinolizinium bromide gives 2,3,4,4a,6,7,11b, 12,13,13a-decahydro-9-methoxy-1-oxo-1H - dibenzo[a,f] quinolizine hydrobromide as a white crystalline product which, after recrystallization from methanol-ether, melts at 220–222° C.

EXAMPLE 67

*2,3,4,4a,6,7,11b,12,13,13a-decahydro-9,10-dimethoxy-13a-methyl-1H-dibenzo[a,f]quinolizine hydrobromide*

A solution of 2.0 g. of 1,2,3,6,7,12,13,13a-octahydro-9,10-dimethoxy-13a-methyldibenzo[a,f]quinolizinium bromide in 200 ml. ethanol is shaken in a Parr bomb over 0.5 g. platinum oxide catalyst at room temperature and 50 p.s.i. gauge of hydrogen pressure. Hydrogen absorption ceases after 10 minutes. The catalyst is filtered and the filtrate is concentrated to an oil. The oil crystallizes on rubbing with ethanol and is recrystallized from ethanol to obtain 2,3,4,4a,6,7,11b,12,13,13a-decahydro - 9,10 - dimethoxy-13a-methyl - 1H - dibenzo[a,f]quinolizine hydrobromide in the form of white crystals, M.P. 235–237° C.

EXAMPLE 68

*1,2,3,3a,5,6,10b,11,12,12a - decahydro - 8,9 - dimethoxy-12a-methylbenzo[a]cyclopenta[f]quinolizine hydrobromide*

In the same way as described in Example 67, 10.0 g. of 2,3,3a,5,6,11,12,12a-octahydro - 8,9 - dimethoxy - 12a-methyl-1H-benzo[a]cyclopenta[f]quinolizinium bromide gives 1,2,3,3a,5,6,10b,11,12,12a-decahydro-8,9-dimethoxy-12a - methylbenzo[a]cyclopenta[f]quinolizine hydrobromide as a white salt which, after recrystallization from methanol melts at 255–257° C.

EXAMPLE 69

*2,3,4,4a,6,7,11b,12,13,13a-decahydro-1-hydroxy-9-methoxy-1H-dibenzo[a,f]quinolizine hydrochloride*

In the same way as described in Example 67, 8.0 g. of 1,2,3,4,4a,6,7,12,13,13a - decahydro-1-hydroxy-9-methoxydibenzo[a,f]quinolizinium bromide gives 2,3,4,4a,6,7, 11b,12,13,13a - decahydro - 1 - hydroxy-9-methoxy-1-H-dibenzo[a,f]quinolizine hydrochloride as a white crystalline product which, after recrystallization from methanol-ether melts at 278–280° C.

EXAMPLE 70

*1 - (α,α - ethylenedioxyethyl) - 1,2,3,3a,5,6,10b,11,12,12a-decahydro 8 - methoxy - 12a - methylbenzo[a]cyclopenta[f]quinolizine*

A solution of 9.5 g. of 1,2,3,3a,5,6,10b,11,12,12a-decahydro - 8 - methoxy - 12a - methyl - 1 - acetylbenzo [a]cyclopenta[f]quinolizine hydrochloride in 600 ml. of benzene containing 10 ml. of ethylene glycol and 0.1 g. of p-toluene sulfonic acid is refluxed for 3 hours under a Dean Stark trap. The solution is cooled and extracted with 300 ml. of a 5% solution of sodium bicarbonate. The benzene solution is dried and evaporated to obtain 1-(α,α-ethylenedioxyethyl) - 1,2,3,3a,5,6,10b,11,12,12a - decahydro - 8 - methoxy - 12a - methylbenzo[a]cyclopenta[f]-quinolizine as a white solid.

EXAMPLE 71

*1,2,3,3a,5,6,10b,11,12,12a - decahydro - 1 - hydroxy - 8-methoxy - 12a - methylbenzo[a]cyclopenta[f]quinolizine hydrobromide*

A solution of 7.7 g. of 3,3a,5,6,10b,11,12,12a-octahydro - 8 - methoxy - 12a - methylbenzo[a]cyclopenta[f]-quinolizin-1(2H)-one hydrobromide in 250 ml. of water is made basic with a 50% solution of sodium hydroxide and the precipitated base is extracted with ether. The ether solution is dried and 2.4 g. of lithium aluminum hydride added. The mixture is refluxed for 3 hours and the reaction mixture is cautiously recomposed with 15 ml. of water. The white precipitate is filtered and washed well with ether. The ether fractions are combined, dried and dry hydrogen bromide passed in until precipitation of the while solid is complete to give 1,2,3,3a,5,6,10b,11,12,12a-decahydro - 1 - hydroxy - 8 - methoxy - 12a - methylbenzo[a]cyclopenta[f]quinolizine hydrobromide. The product is recrystallized from ethanol-ether to M.P. 249–250° C.

EXAMPLE 72

*1,2,3,3a,5,6,10b,11,12,12a - decahydro - 8,9 - dimethoxy-12a - methyl - 1 - carboxybenzo[a]cyclopenta[f]quinolizine hydrochloride*

A solution of 12.0 g. of 1,2,3,3a,5,6,10b,11,12,12a-decahydro - 8,9 - dimethoxy - 12a - methyl - 1 - carbomethoxybenzo[a]cyclopenta[f]quinolizine hydrochloride in 300 ml. of 4 N hydrochloric acid is refluxed for 18 hours. The solution is evaporated to dryness under reduced pressure to obtain 1,2,3,3a,5,6,10b,11,12,12a - decahydro - 8,9 - dimethoxy - 12a - methyl - 1 - carboxybenzo[a]cyclopenta [f]quinolizine hydrochloride as a white solid residue which, after recrystallization from ethanol-ether melts at 204–206° C.

EXAMPLE 73

*1,2,3,3a,5,6,10b,11,12,12a - decahydro - 8 - methoxy - 12a-methyl - 1 - carboxybenzo[a]cyclopenta[f]quinolizine hydrochloride*

In the same way as described in Example 72, 3.0 g. of 1,2,3,3a,5,6,10b,11,12,12a - decahydro - 8 - methoxy-12a - methyl - 1 - carbethoxybenzo[a]cyclopenta[f]quinolizine hydrochloride gives 1,2,3,3a,5,6,10b,11,12,12a-decahydro - 8 - methoxy - 12a - methyl - 1 - carboxybenzo [a]cyclopenta[f]quinolizine hydrochloride as a white solid which after being recrystallized from ethanol-ether melts at 175–176° C.

EXAMPLE 74

*1,2,3,3a,5,6,10b,11,12,12a-decahydro-1,8-dihydroxy-12a-methyl-benzo[a]cyclopenta[f]quinolizine hydrobromide*

A solution of 7.7 g. of 1,2,3,3a,5,6,10b,11,12,12a-decahydro - 1 - oxo - 8 - hydroxy - 12a - methylbenzo[a] cyclopenta[f]-quinolizine hydrobromide in 500 ml. water is made basic with a 28% solution of ammonium hydroxide and the precipitated base is filtered and washed with water. The base is dissolved in 1.5 liters of refluxing ethanol, 4.5 g. potassium borohydride are added and the mixture is refluxed for 18 hours. An additional 4.5 g. of potassium borohydride are added and the reflux continued for 6 more hours. The mixture is concentrated to a semi-solid, taken up in water and acidified with 2 N hydrochloric acid. Dilute ammonium hydroxide solution is added until precipitation of the white solid is complete to give 1,2,3,3a,-

5,6,10b,11,12,12a - decahydro - 1,8 - dihydroxy - 12a-methylbenzo[a]cyclopenta[f]quinolizine hydrobromide. The material is recrystallized from acetone-water to M.P. 213–215° C.

EXAMPLE 75

*1,2,3,3a,5,6,10b,11,12,12a-decahydro-8-methoxy-12a-methyl-1-acetylbenzo[a]cyclopenta[f]quinolizine*

To a suspension of 2.0 g. of 1,2,3,3a,5,6,10b,11,12,12a-decahydro - 8 - methoxy - 12a - methyl - 1 - carboxybenzo [a]cyclopenta[f]quinolizine hydrochloride in 100 ml. of dry tetrahydrofuran is added dropwise with stirring at room temperature 70 ml. of a 4 molar solution of methyl lithium in dry ether. The mixture is allowed to stir for one hour at 20–25° C. There is then added cautiously 80 ml. of water and the ether and tetrahydrofuran are removed by distillation. The aqueous solution is then extracted with ether. The ether is dried and evaporated to obtain 1,2,3, 3a,5,6,10b,11,12,12a - decahydro - 8 - methoxy - 12a-methyl - 1 - acetylbenzo[a]cyclopenta[f]quinolizine as a pale yellow solid which is recrystallized from ethanol-water to M.P. 124–125° C.

EXAMPLE 76

*1,2,3,3a,5,6,10b,11,12,12a-decahydro-8,9-dimethoxy-12a-methyl-1-acetylbenzo[a]cyclopenta[f]quinolizine*

In the same way as described in Example 75, 1.0 g. of 1,2,3,3a,5,6,10b,11,12,12a - decahydro - 8,9 - dimethoxy-12a - methyl 1 - carboxybenzo[a]cyclopenta[f]quinolizine hydrochloride gives 1,2,3,3a,5,6,10b,11,12,12a-decahydro-8,9 - dimethoxy - 12a - methyl - 1 - acetylbenzo[a]cyclopenta[f]quinolizine in the form of a white crystalline solid which, after recrystallization from ethanol-water melts at 124–126° C.

EXAMPLE 77

*2,3,3a,5,6,11,12,12a-octahydro-8,9-dihydroxy-1H-benzo[a]cyclopenta[f]quinolizinium bromide*

A solution of 1.0 g. of 2,3,3a,5,6,11,12,12a-octahydro-8,9 - dimethoxy - 1H - benzo[a]cyclopenta[f]quinolizinium dichlorophosphate in 10 ml. of 48% hydrobromic acid is refluxed for 4 hours. The excess acid is removed by distillation under reduced pressure. The oil crystallizes on scratching with ethanol and is recrystallized from ethanol-ether to obtain 2,3,3a,5,6,11,12,12a-octahydro-8,9-dihydroxy - 1H - benzo[a]cyclopenta[f]quinolizinium bromide melting at 222–224° C.

EXAMPLE 78

*1,2,3,3a,5,6,10b,11,12,12a-decahydrobenzo[a]cyclopenta[f]quinolizine-8,9-diol hydrobromide*

In the same way as described in Example 77, 1.0 g. of 1,2,3,3a,5,6,10b,11,12,12a - decahydro - 8,9 - dimethoxybenzo[a]cyclopenta[f]quinolizine hydrobromide after demethylation gives 1,2,3,3a,5,6,10b,11,12,12a - decahydrobenzo[a]cyclopenta[f]quinolizine - 8,9 - diol hydrobromide as a white crystalline hydrobromide which can be recrystallized from water to M.P. 285–286° C.

EXAMPLE 79

*1,2,3,3a,5,6,10b,11,12,12a-decahydrobenzo[a]cyclopenta[f]quinolizin-8-ol-hydrobromide*

In the same way as described in Example 77, 5.3 g. of 1,2,3,3a,5,6,10b,11,12,12a - decahydro - 8 - methoxybenzo [a]cyclopenta[f]quinolizine hydrobromide are demethylated to give 1,2,3,3a,5,6,10b,11,12,12a-decahydrobenzo [a]cyclopenta[f]quinolizin-8-ol-hydrobromide as an off-white solid, M.P. 272–274° C.

EXAMPLE 80

*1,2,3,4,4a,6,7,12,13,13a-decahydro-9,10-dihydroxy-13a-methyldibenzo[a,f]quinolizinium bromide*

In the same way as described in Example 77, 10 g. of 2,3,4,4a,6,7,13,13a - octahydro-9,10-dimethoxy-13a-methyl-1H-dibenzo[a,f]quinolizine are demethylated to give 1,2,3,4,4a,6,7,12,13,13a - decahydro - 9,10-dihydroxy-13a-methyldibenzo[a,f]quinolizinium bromide as yellow crystals which, after being recrystallized from methanol-ether melt at 256–258° C.

EXAMPLE 81

*2,3,4,4a,6,7,11b,12,13,13a-decahydro-13a-methyl-1H-dibenzo[a,f]quinolizine-9,10-diol hydrobromide*

In the same way as described in Example 77, 6.8 g. of 2,3,4,4a,6,7,11b,12,13a - decahydro - 9,10-dimethoxy-13a-methyl-1H-dibenzo[a,f]quinolizine hydrobromide are demethylated to give 2,3,4,4a,6,7,11b,12,13,13a-decahydro-13a - methyl-1H-dibenzo[a,f]quinolizine-9,10-diol hydrobromide as a white solid which is recrystallized from methanol-ether to M.P. 255–256° C.

EXAMPLE 82

*1,2,3,6,7,12,13,13a-octahydro-9,10-dihydroxy-13a-methyl-dibenzo-[a,f]quinolizinium bromide*

In the same way as described in Example 77, 2.4 g. of 1,2,3,6,7,12,13,13a - octahydro-9,10-dimethoxy-13a-methyldibenzo[a,f]quinolizinium bromide are demethylated to give 1,2,3,6,7,12,13,13a - octahydro - 9,10-dihydroxy-13a-methyldibenzo[a,f]quinolizinium bromide as yellow crystals which, after recrystallization from methanol-ether melt at 225–227° C.

EXAMPLE 83

*2,3,3a,5,6,11,12,12a,octahydro-8,9-dihydroxy-12a-methyl-1H-benzo[a]cyclopenta[f]quinolizinium bromide*

In the same way as described in Example 77, 6.0 g. of 2,3,3a,5,6,11,12,12a - octahydro - 8,9 - dimethoxy - 12a-methyl-1H-benzo[a]cyclopenta[f]quinolizinium bromide are demethylated to give 2,3,3a,5,6,11,12,12a-octahydro-8,9 - dihydroxy - 12a - methyl-1H-benzo[a]cyclopenta[f] quinolizinium bromide as yellow crystals which, after being recrystallized from methanol-ether melt at 243–244° C.

EXAMPLE 84

*1,2,3,3a,5,6,10b,11,12,12a-decahydro-12a-methylbenzo[a]cyclopenta[f]quinolizine-8,9-diol hydrobromide*

In the same way as described in Example 77, 6.5 g. of 1,2,3,3a,5,6,10b,11,12,12a - decahydro - 8,9 - dimethoxy-12a - methylbenzo[a]cyclopenta[f]quinolizine hydrobromide are demethylated to give 1,2,3,3a,5,6,10b,11,12,12a-decahydro - 12a-methylbenzo[a]cyclopenta[f]quinolizine-8,9-diol hydrobromide as a white solid which, after being recrystallized from methanol-ether melts at 175–180° C.

EXAMPLE 85

*1,2,3,4,4a,6,7,12,13,13a-decahydro-9-hydroxy-1-oxodibenzo[a,f]quinolizinium bromide*

In the same way as described in Example 77, 6.0 g. of 1,2,3,4,4a,6,7,12,13,13a - decahydro - 9 - methoxy-1-oxodibenzo[a,f]quinolizinium bromide are demethylated to give 1,2,3,4,4a,6,7,12,13,13a-decahydro-9-hydroxy-1-oxodibenzo[a,f]quinolizinium bromide as a yellow solid which, after being recrystallized from methanol-ether melts at 241–244° C.

EXAMPLE 86

*1,2,3,4,4a,6,7,12,13,13a-decahydro-1,9-dihydroxydibenzo[a,f]quinolizinium bromide*

A solution of 6.1 g. of 1,2,3,4,4a,6,7,12,13,13a-decahydro - 1 - hydroxy-9-methoxydibenzo[a,f]quinolizinium bromide in 80 ml. of 48% hydrobromic acid is refluxed for 20 minutes then evaporated to an oil under reduced pressure. The oil crystallizes on rubbing with ethanol to obtain 1,2,3,4,4a,6,7,12,13,13a - decahydro-1,9-dihydroxydibenzo[a,f]quinolizinium bromide as a yellow solid which, after being recrystallized from ethanol-ether melts at 264–267° C.

EXAMPLE 87

*2,3,4,4a,6,7,11b,12,13,13a-decahydro-1-oxo-9-hydroxy-1H-dibenzo[a,f]quinolizine hydrobromide*

In the same way as described for Example 77, 0.3 g. of 2,3,4,4a,6,7,11b,12,13,13a-decahydro - 1 - oxo-9-methoxy-1H-dibenzo[a,f]quinolizine hydrobromide is demethylated to give 2,3,4,4a,6,7,11b,12,13,13a-decahydro-1-oxo-9-hydroxy-1H-dibenzo[a,f]quinolizine hydrobromide as a tan solid which, after being recrystallized from methanol-ether melts at 248–251° C.

EXAMPLE 88

*1,2,3,3a,5,6,10b,11,12,12a - decahydro - 1 - oxo-8-hydroxy-12a - methylbenzo[a]cyclopenta[f]quinolizine hydrobromide*

In the same way as described in Example 77, 0.35 g. of 1,2,3,3a,5,6,10b,11,12,12a-decahydro - 1 - oxo-8-methoxy-12a - methylbenzo[a]cyclopenta[f]quinolizine hydrobromide is demethylated to give 1,2,3,3a,5,6,10b,11,12,12a-decahydro - 1 - oxo-8-hydroxy-12a-methylbenzo[a]cyclopenta[f]quinolizine hydrobromide as a white solid which, after being recrystallized from methanol melts at 282–285° C.

EXAMPLE 89

*2,3,3a,5,6,11,12,12a-octahydro-8-hydroxy-1H-benzo[a]cyclopenta[f]quinolizinium bromide*

A solution of 9.3 g. of 2,3,3a,5,6,11,12,12a-octahydro-8 - methoxy-1H-benzo[a]cyclopenta[f]quinolizinium perchlorate in 100 ml. acetone is cooled to 10° C. with ice and poured into 300 ml. of a 5% solution of sodium hydroxide. The precipitated solid is filtered, dissolved in 150 ml. of 48% hydrobromic acid and refluxed for 6 hours. The excess acid is removed by distillation under reduced pressure to obtain 2,3,3a,5,6,11,12,12a-octahydro-8-hydroxy - 1H - benzo[a]cyclopenta[f]quinolizinium bromide as a solid residue which, after being recrystallized from methanol melts at 275–277° C.

It is understood that the foregoing detailed description is given merely by way of illustration and that many variations may be made therein without departing from the spirit of our invention.

Having described our invention, what we desire to secure by Letters Patent is:

1. A compound selected from the group consisting of free bases of the formulae:

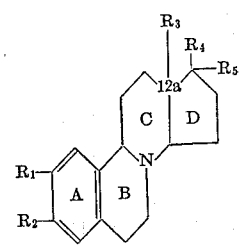 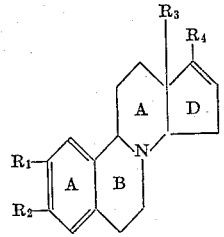

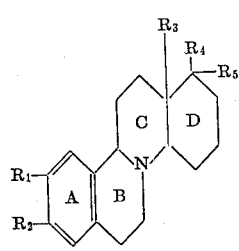 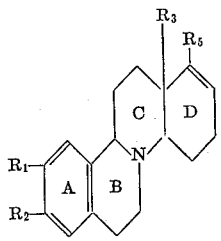

wherein $R_1$ and $R_2$ each is a member selected from the group consisting of hydrogen, hydroxy, and lower alkoxy; $R_3$ is a member selected from the group consisting of hydrogen, and lower alkyl; $R_4$ is a member selected from the group consisting of hydrogen, lower alkyl, alkoxy, alkenyl, and $R_5$ is a member selected from the group consisting of hydrogen, hydroxy, acyloxy of a carboxylic acid, alkoxy, —COOH, —COOR$_{11}$ in which R is lower alkyl

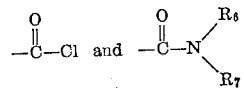

in which $R_6$ and $R_7$ is each a member selected from the group consisting of hydrogen, and lower alkyl; and $R_4$ and $R_5$ taken together with the carbon atom to which they are attached form a member selected from the group consisting of keto and cyclic ketal; and the nontoxic pharmaceutically acceptable salts thereof.

2. 2,3,4,4a,6,7,11b,12,13,13a - decahydro - 1 - oxo - 9-methoxy-1H-dibenzo[a,f]quinolizine hydrobromide.

3. 1,2,5,6,12,12a - hexahydro - 8 - methoxy - 12a-methyl-1-carbethoxybenzo[a]cyclopenta[f]quinoline.

4. 1,2,3,3a,5,6,10b,11,12,12a - decahydro - 8 - methoxy-12a - methyl - 1 - carbethoxybenzo[a]cyclopenta[f]quinolizine hydrochloride.

5. 1,2,3,3a,5,6,10b,11,12,12a - decahydro - 8 - methoxy-12a - methyl - 1 - carboxybenzo[a]cyclopenta[f]quinolizine hydrochloride.

6. 1,2,3,3a,5,6,10b,11,12,12a - decahydro - 8 - methoxy-12a-methyl-1-acetylbenzo[a]cyclopenta[f]quinolizine.

7. 1 - (α,α - ethylenedioxyethyl) - 1,2,3,3a,5,6,10b,11,12,12a - decahydro - 8 - methoxy - 12a - methylbenzo[a]cyclopenta[f]quinolizine.

8. 2,3,4,4a,6,7,11b,12,13,13a - decahydro - 1 - hydroxy-9-methoxy-1H-dibenzo[a,f]quinolizine hydrobromide.

9. 1,2,3,3a,5,6,12,12a - octahydro - 8 - methoxy - 12a-methyl - 1 - carbethoxy - 1H - benzo[a]cyclopenta[f]quinolizine.

10. 1,2,3,3a,5,6,10b,11,12,12a - decahydro - 8,9 - dihydroxy - 12a - methylbenzo[a]cyclopenta[f]quinolizine hydrobromide.

11. 1,2,3,3a,5,6,10b,11,12,12a - decahydrobenzo[a]cyclopenta[f]quinolizin-8-ol hydrobromide.

12. 1,2,3,3a,5,6,10b,11,12,12a - decahydro - 8 - methoxybenzo[a]cyclopenta[f]quinolizine hydrobromide.

13. 1,2,3,3a,5,6,10b,11,12,12a - decahydro - 8,9 - dimethoxy - 12a - methylbenzo[a]cyclopenta[f]quinolizine hydrobromide.

14. 2,3,4,4a,6,7,11b,12,13,13a - decahydro - 13a - methyl-1H-dibenzo[a,f]quinolizin-9,10-diol hydrobromide.

15. 2,3,4,4a,6,7,13,13a - octahydro - 9,10 - dimethoxy-13a-methyl-1H-dibenzo[a,f]quinolizine.

16. 2,3,4,4a,6,7,11b,12,13,13a - decahydro - 9,10 - dimethoxy - 13a - methyl - 1H - dibenzo[a,f]quinolizine hydrobromide.

17. 1,2,3,3a,5,6,10b,11,12,12a - decahydro - 8,9 - dimethoxybenzo[a]cyclopenta[f]quinolizine hydrobromide.

18. 1,2,3,3a,5,6,10b,11,12,12a - decahydro - 1 - hydroxy - 8 - methoxy - 12a - methylbenzo[a]cyclopenta[f]quinolizine.

19. 1,2,3,3a,5,6,10b,11,12,12a - decahydrobenzo[a]cyclopenta[f]quinolizine-8,9-diol hydrobromide.

20. 1,2,3,3a,5,6,10b,11,12,12a - decahydro - 1,8 - dihydroxy-12a-methylbenzo[a]cyclopenta[f]quinolizine.

21. 2,3,4,4a,6,7,11b,12,13,13a - decahydro - 9,10 - dimethoxy - 1 - oxo - 13a - methyl - 1H - dibenzo[a,f]quinolizine hydrobromide.

22. 3,3a,5,6,10b,11,12,12a - octahydro - 8 - methoxy - 12a - methylbenzo[a]cyclopenta[f]quinolizine - 1(2H)-one hydrobromide.

23. 3,3a,5,6,10b,11,12,12a - octahydro - 8 - hydroxy - 12a - methylbenzo[a]cyclopenta[f]quinolizin - 1(2H)-one hydrobromide.

24. 3,3a,5,6,10b,11,12,12a - octahydro - 9,10 - dimethoxy - 12a-methylbenzo[a]cyclopenta[f]quinolizin-1(2H)-one hydrobromide.

25. 2,3,4,4a,6,7,11b,12,13,13a - decahydro - 1 - hydroxy - 9,10 - dimethoxy - 1H - dibenzo[a,f]quinolizine hydrobromide.

26. 2,3,4,4a,6,7,11b,12,13,13a - decahydro - 1 oxo - 9,10-dimethoxy-1H-dibenzo[a,f]quinolizine hydrobromide.

27. 2,5,6,11,12,12a - hexahydro - 8,9 - dimethoxy - 12a-methylbenzo[a]cyclopenta[f]quinolizin - 1 - one perchlorate.

28. 2,3,3a,5,6,11,12,12a - octahydro - 8,9 - dimethoxy-12a - methylbenzo[a]cyclopenta[f]quinolizin - 1 - one perchlorate.

29. 1,2,3,3a,5,6,10b,11,12,12a - decahydro - 8,9 - dimethoxy - 12a - methyl - 1 - acetylbenzo[a]cyclopenta[f]quinolizine hydrochloride.

30. 1,2,5,6,12,12a - hexahydro - 8,9 - dimethoxy - 12a-methyl-1-carboxybenzo[a]cyclopenta[f]quinolizine.

31. 1,2,5,6,12,12a - hexahydro - 8,9 - dimethoxy - 12a-methyl - 1 - diethylcarbamoylbenzo[a]cyclopenta[f]quinolizine.

32. 1,2,3,3a,5,6,10b,11,12,12a - decahydro - 8,9 - dimethoxy - 12a - methyl - 1 - carbomethoxybenzo[a]cyclopenta[f]quinolizine hydrochloride.

33. 1,2,3,3a,5,6,10b,11,12,12a - decahydro - 8,9 - dimethoxy - 12a - methyl - 1 - carboxybenzo[a]cyclopenta[f]quinolizine hydrochloride.

References Cited
UNITED STATES PATENTS

| | | | |
|---|---|---|---|
| 2,425,320 | 8/1947 | Hill | 252—149 |
| 2,524,643 | 10/1950 | Walter et al. | 260—294.7 |
| 2,738,350 | 3/1956 | Mazur | 260—289 |
| 2,759,935 | 8/1956 | Speeter | 260—294.7 |
| 2,877,225 | 2/1959 | Taylor | 260—286 |
| 2,883,374 | 4/1959 | Enders | 260—289 |
| 2,954,382 | 9/1960 | Osbond | 260—289 |
| 3,022,312 | 2/1962 | Wildi | 260—289 |
| 3,024,242 | 3/1962 | Bodanszky et al. | 260—294.7 |
| 3,025,299 | 3/1962 | Pfister et al. | 260—289 |
| 3,036,081 | 5/1962 | Nomine et al. | 260—294.7 |

OTHER REFERENCES

Fieser et al.: "Natural Products," 3rd edition, Reinhold, 1949, pp. 150, 232–3, 243.

Burger: Medicinal Chemistry, Interscience, 2nd ed., 1960, p. 497.

Kanaoka: Chem. Pharm. Bull., vol. 7 (1959), pp. 595–597.

ALEX MAZEL, *Primary Examiner.*

NICHOLAS RIZZO, HENRY R. JILES, *Examiners.*

D. M. KERR, D. G. DAUS, *Assistant Examiners.*